Patented Aug. 26, 1952

2,608,562

UNITED STATES PATENT OFFICE 2,608,562

METHOD OF PRODUCING AMIDES

Edward T. Roe and Daniel Swern, Philadelphia, Pa., assignors to the United States of America as represented by the Secretary of Agriculture No Drawing. Application June 7, 1949, Serial No. 97,712

10 Claims. (Cl. 260—404)

(Granted under the act of March 3, 1883, as amended April 30, 1928; 370 O. G. 757)

This application is made under the act of March 3, 1883, as amended by the act of April 30, 1928, and the invention herein described, if patented in any country, may be manufactured and used by or for the Government of the United States of America for governmental purposes throughout the world without the payment to us of any royalty thereon.

This invention relates to amides of higher aliphatic monocarboxylic acids and has among its objects the provision of new methods for producing such amides.

We have found that amides of higher, aliphatic monocarboxylic acids are formed on reacting the corresponding acid with a compound selected from the group consisting of formamide ($HCONH_2$), acetamide ($CH_3CONH_2$) and acetylurea ($CH_3CONHCONH_2$).

According to the invention, a higher aliphatic monocarboxylic acid, which may be a saturated or unsaturated fatty acid, and preferably one having from 6 to 18 carbon atoms, is reacted with any of the above compounds by heating the reactants at reaction temperature, preferably within the range of about from 180° C. to 250° C. for a length of time sufficient to bring the reaction essentially to completion. The amide is then recovered from the reaction mixture by any suitable means, such as solvent extraction.

The following examples are illustrative of the invention:

Example I

A mixture of 28.3 g. (0.10 mole) of oleic acid and 5.4 g. (0.12 mole) of formamide was heated in a 200 ml. three-neck flask, provided with a thermometer, an upright steam-heated condenser, and a gas inlet tube. The temperature was raised to 185° C. in about one-half hour, and another hour was required to reach 230° C. The reaction mixture was then maintained at 230° C. for an additional half hour.

The dark brown reaction mixture which began to solidify at 56° C. was dissolved in 65 ml. of acetone, treated with 0.6 g. decolorizing carbon for one-half hour, and filtered. Sufficient acetone was added to the filtrate to increase the solvent-solute ratio to 3 ml./g., and the solution was cooled to 0° C. The copious white crystalline precipitate thus obtained weighed 16.7 g. and consisted essentially of oleamide, M. P. 72.0°–72.50° C. This material was recrystallized from acetone, yielding 14 g. of pure oleamide, M. P. 75.0°–75.5° C.

Example II

A mixture of 25.6 g. (0.10 mole) of palmitic acid and 5.4 g. (0.12 mole) of formamide was treated as described in the foregoing example. The reaction mixture was dissolved in 95% ethanol (7 ml./g.) and the solution cooled to 25° C. The white crystalline precipitate thus obtained weighed 11.3 g. and consisted essentially of palmitamide, M. P. 101.5°–102.0° C.

Example III

A mixture of 23.2 g. (0.20 mole) of caproic acid and 10.8 g. (0.24 mole) of formamide was treated as described in Example I. The reaction mixture was dissolved in a petroleum fraction consisting essentially of hexane, B. P. 65°–70° C., and the solution cooled to 0° C. The white crystalline precipitate so obtained weighed 12.2 g. and consisted essentially of caproamide, M. P. 98.0°–99.5° C.

Example IV

A mixture of 25.6 g. (0.1 mole) of palmitic acid and 8.9 g. (0.15 mole) of acetamide was heated for 2 hours at 230° C. in a 500 ml. three-neck flask provided with a thermometer, a short distilling adapter and a gas inlet tube.

The contents of the flask were then cooled, dissolved in 150 ml. of 95% ethanol, treated with 0.6 g. of decolorizing carbon for one-half hour, and filtered. Sufficient alcohol was added to the filtrate to increase the solvent-solute ratio to 8 ml./g., and the solution was cooled to 25° C. The precipitate so obtained weighed 9.1 g. and consisted essentially of palmitamide, M. P. 101.0°–102.0° C.

Example V

A mixture of 28.3 g. (0.1 mole) of oleic acid and 10.3 g. (0.1 mole) of acetylurea was heated in a 200 ml. three-neck flask provided with a thermometer, air condenser and gas inlet tube. The temperature was raised to 230° C. in 40 minutes and an attempt was made to maintain it at this level for five hours; however, the temperature of the reaction mixture gradually decreased to 215° C. during this time. To the cooled reaction mixture was added 32 ml. of hot acetone and the insoluble portion was filtered off and washed with 32 ml. of hot acetone. The solution was treated with 0.6 g. of decolorizing carbon and filtered. Sufficient acetone was added to the filtrate to bring the solvent-solute ratio to 3 ml./g., and the solution was cooled to 0° C. The precipitate so obtained weighed 16 g. and consisted essentially of oleamide, M. P. 69.0°–71.0° C. Recrystallization from 95% ethanol yielded 11.6 g. of pure oleamide, M. P. 76.0° C.

Following the procedures described in the foregoing examples, caproamide and oleamide can be obtained by reacting acetamide with caproic and oleic acid respectively, and caproamide and palmitamide can be obtained by interaction of the corresponding acids with acetylurea.

The corresponding acid amides are obtained by analogous procedures on reacting formamide, acetamide, or acetylurea with other aliphatic, saturated, monoethenoic, polythenoic, or hydroxy carboxylic acids such as capric, lauric, myristic, stearic, myristoleic, palmitoleic, petroselinic, petrolselaidic elaidic, vaccenic, erucic, linoleic, linolenic, eleostearic, arachidonic, ricinoleic, 10-hydroxystearic, and 9,10-dihydroxystearic.

We claim:

1. A process comprising reacting a higher aliphatic monocarboxylic acid with a compound selected from the group consisting of formamide, acetamide, and acetyurea to produce the amide of said acid.

2. A process comprising reacting a higher aliphatic monocarboxylic acid with a compound selected from the group consisting of formamide, acetamide, and acetylurea at a temperature of about from 180° to 250° C. to produce the amide of said acid.

3. A process comprising reacting an aliphatic monocarboxylic acid having from 6 to 18 carbon atoms with a compound selected from the group consisting of formamide, acetamide, and acetylurea at a temperature of about from 180° to 250° C. to produce the amide of said acid.

4. The process of claim 3, wherein the acid is caproic acid.

5. The process of claim 3, wherein the acid is oleic acid.

6. The process of claim 3, wherein the acid is palmitic acid.

7. A process comprising reacting an aliphatic monocarboxylic acid having from 6 to 18 carbon atoms with formamide at a tempreature of about from 180° to 250° C. to produce the amide of said acid.

8. A process comprising reacting an aliphatic monocarboxylic acid having from 6 to 18 carbon atoms with acetamide at a temperature of about from 180° to 250° C. to produce the amide of said acid.

9. A process comprising reacting oleic acid with formamide at a temperature of about from 180° to 250° C. to produce oleamide.

10. A process comprising reacting oleic acid with acetamide at a temperature of about from 180° to 250° C. to produce oleamide.

EDWARD T. ROE.
DANIEL SWERN.

REFERENCES CITED

The following references are of record in the file of this patent:

UNITED STATES PATENTS

| Number | Name | Date |
|---|---|---|
| Re. 21,530 | Kritchevsky | Aug. 13, 1940 |
| 1,973,860 | Ulrich | Sept. 18, 1934 |
| 1,989,968 | Bruson | Feb. 5, 1935 |
| 2,109,941 | D'Alelio et al. | Mar. 1, 1938 |

OTHER REFERENCES

Cherbuliez et al., Helvetica Chimeca Acta 29, 1438–46 (1946).

Biehringer et al., Berichte, 39. 3348–56 (1906).